Figure 1:
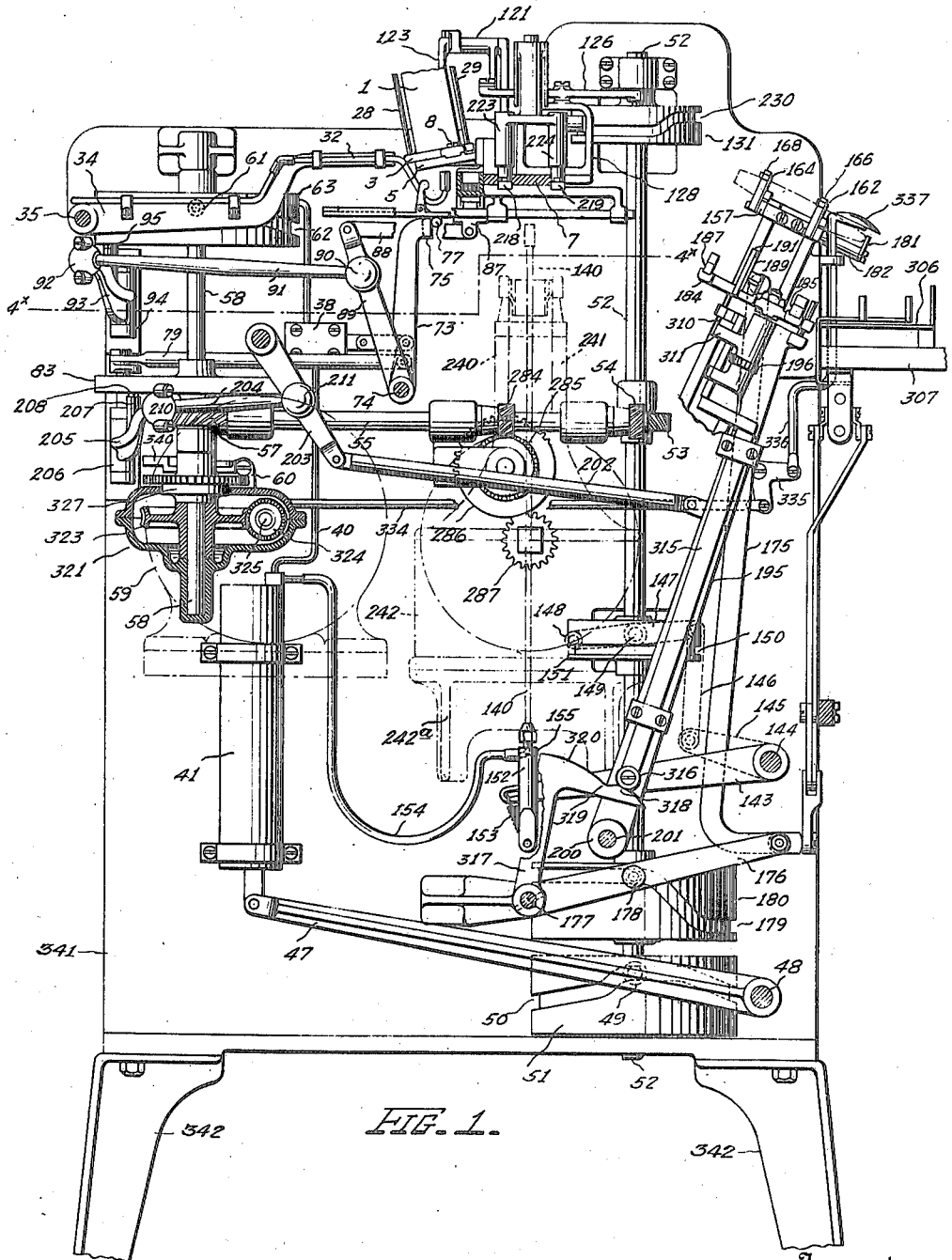

R. D. SCHOENWETTER.
CIGAR BANDING MACHINE.
APPLICATION FILED AUG. 16, 1916.

1,416,982.

Patented May 23, 1922.
9 SHEETS—SHEET 1.

Inventor
Reinhold D. Schoenwetter
By John N. Holt
His Attorney

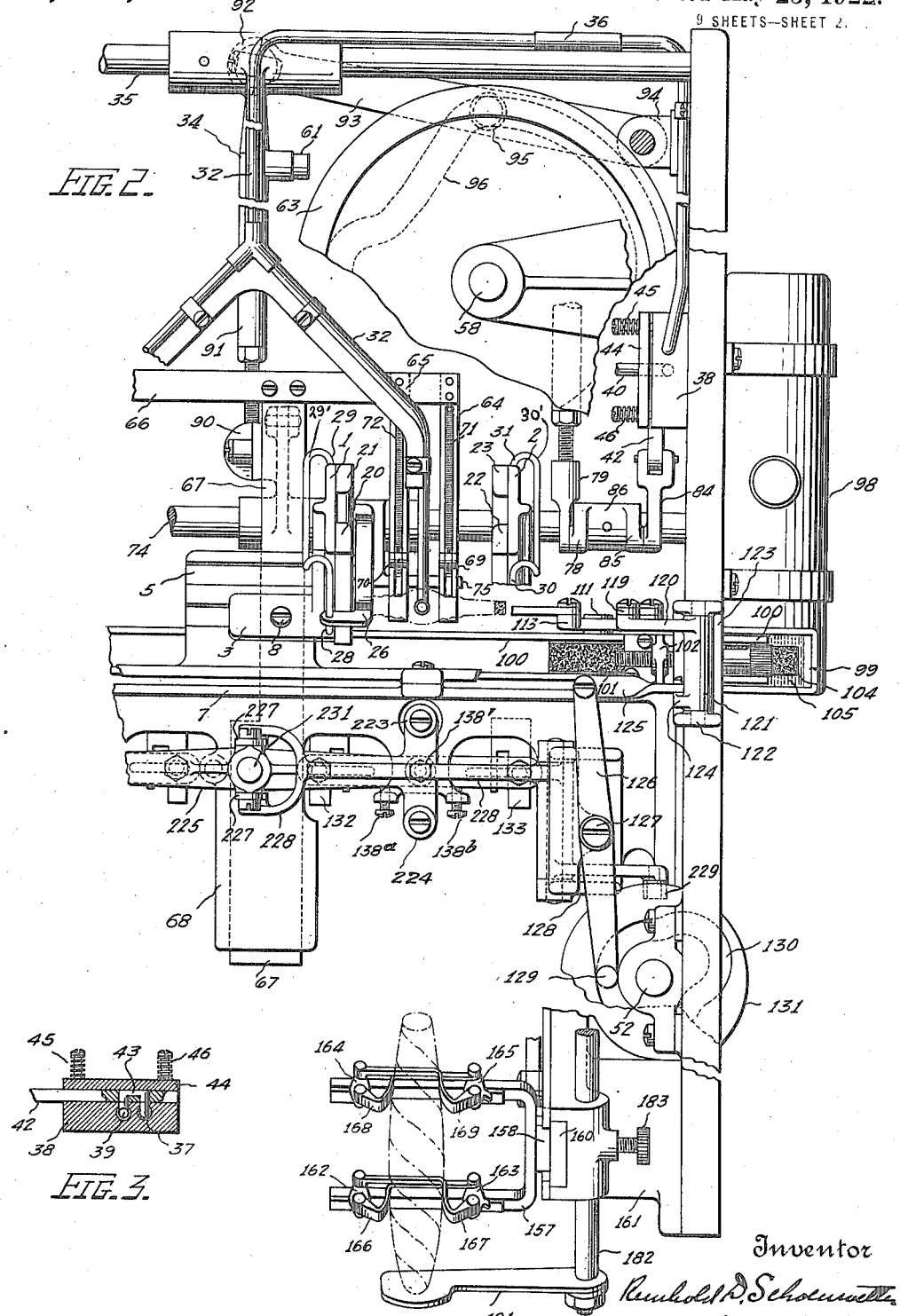

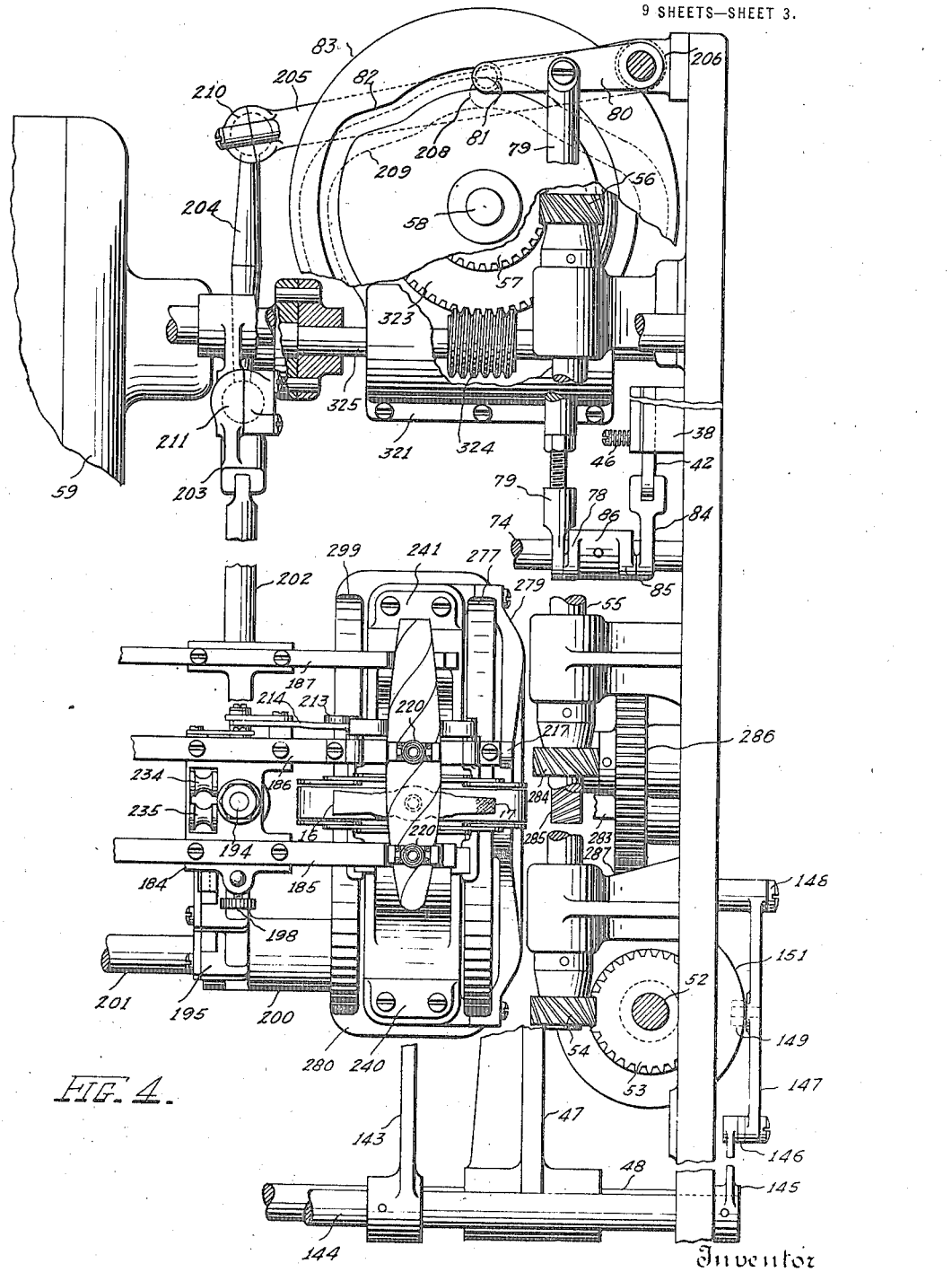

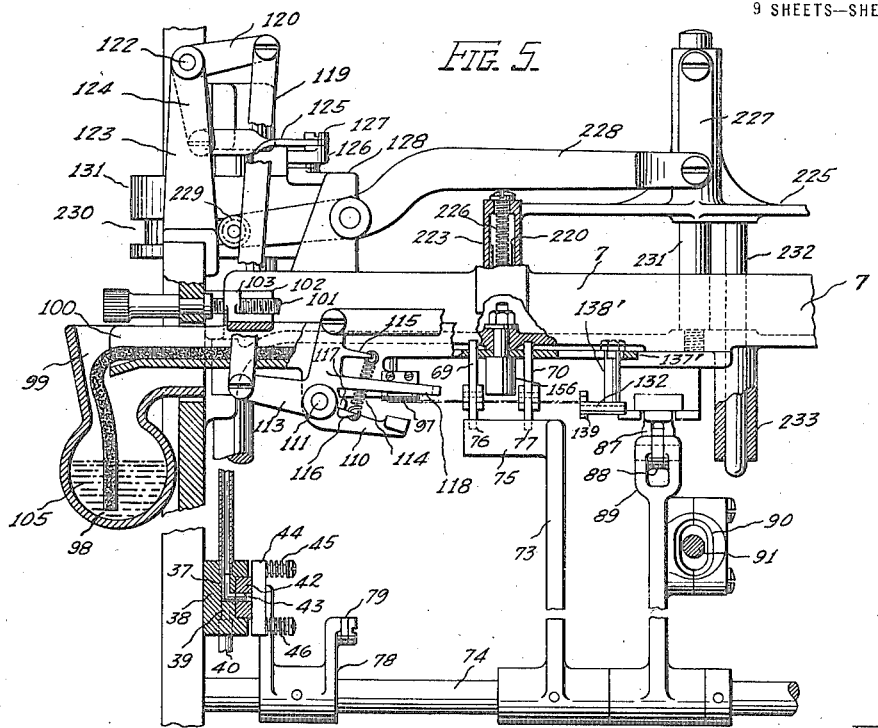

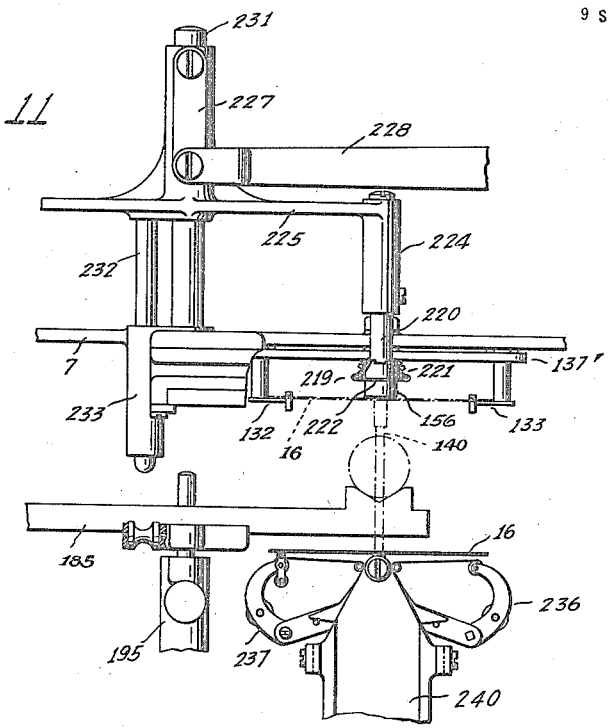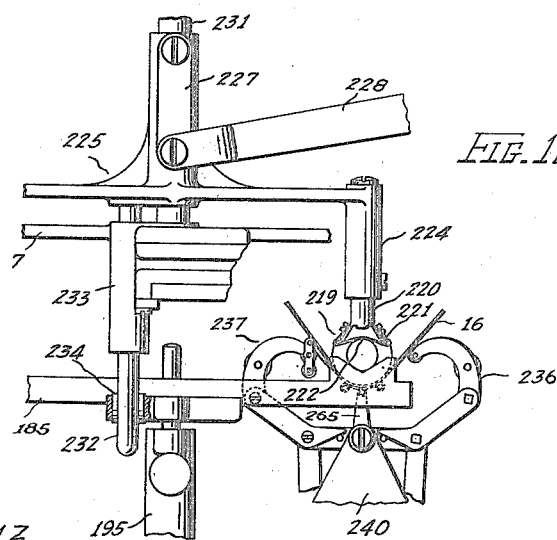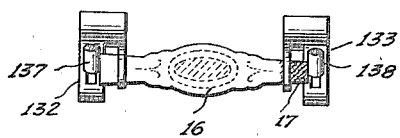

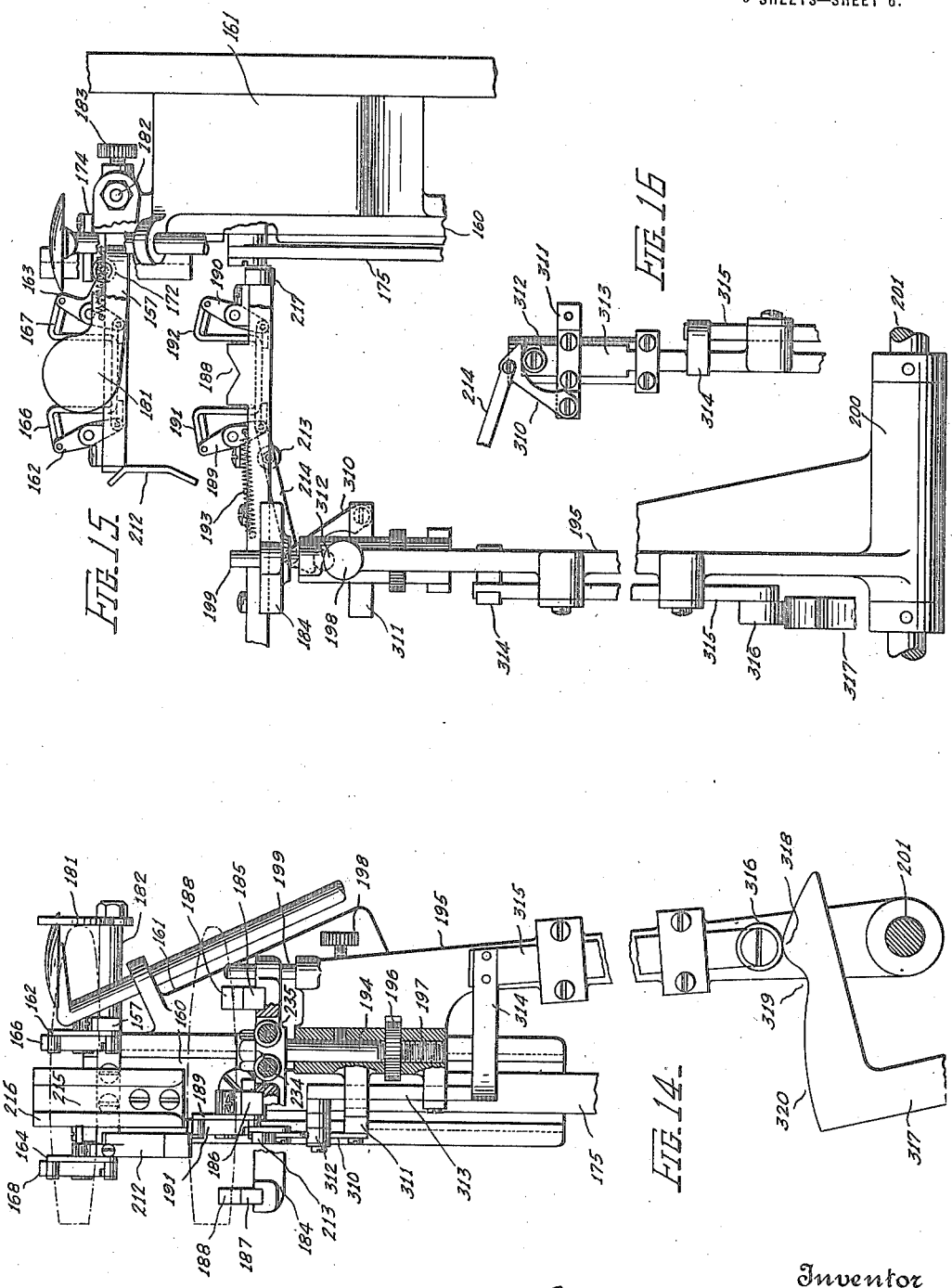

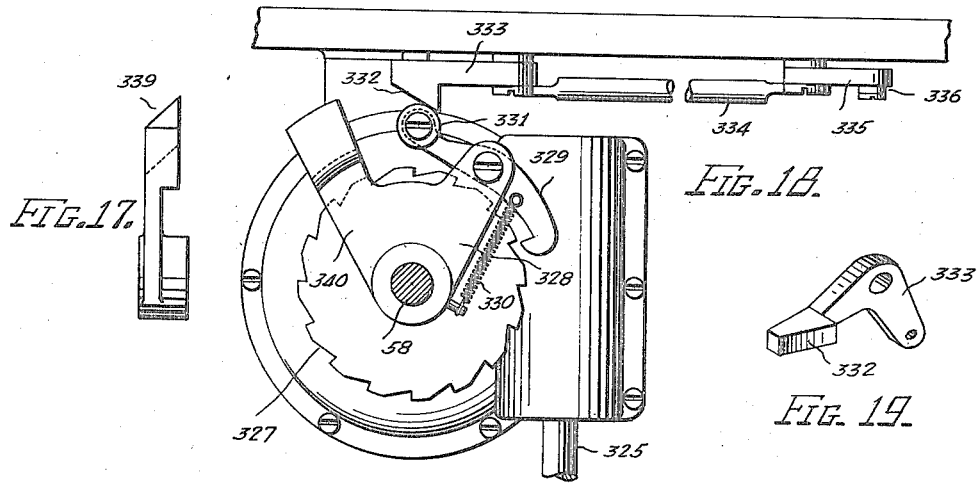
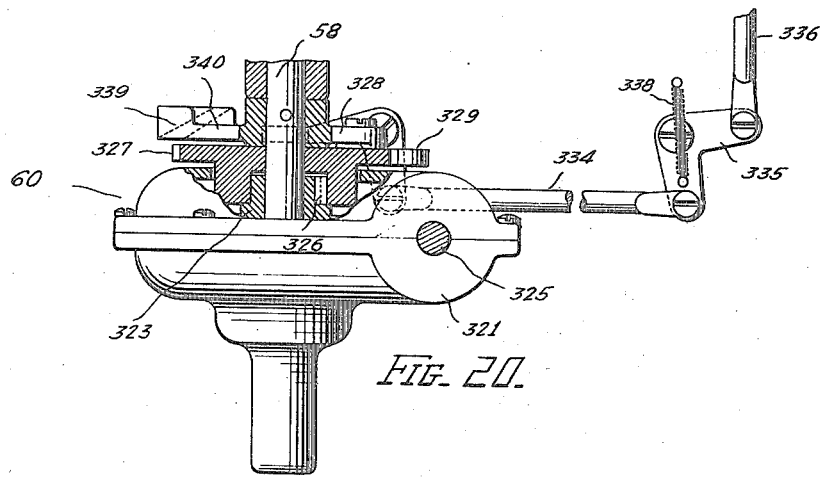
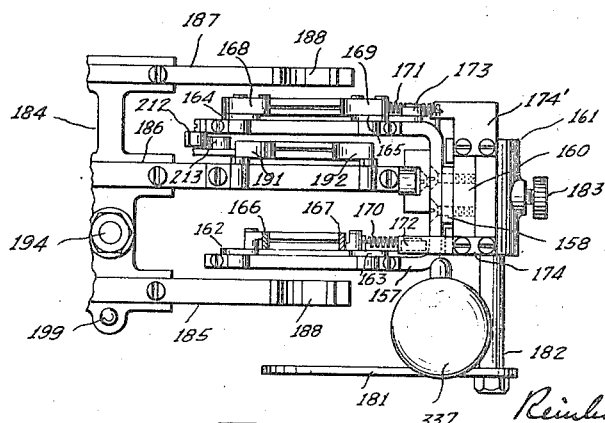

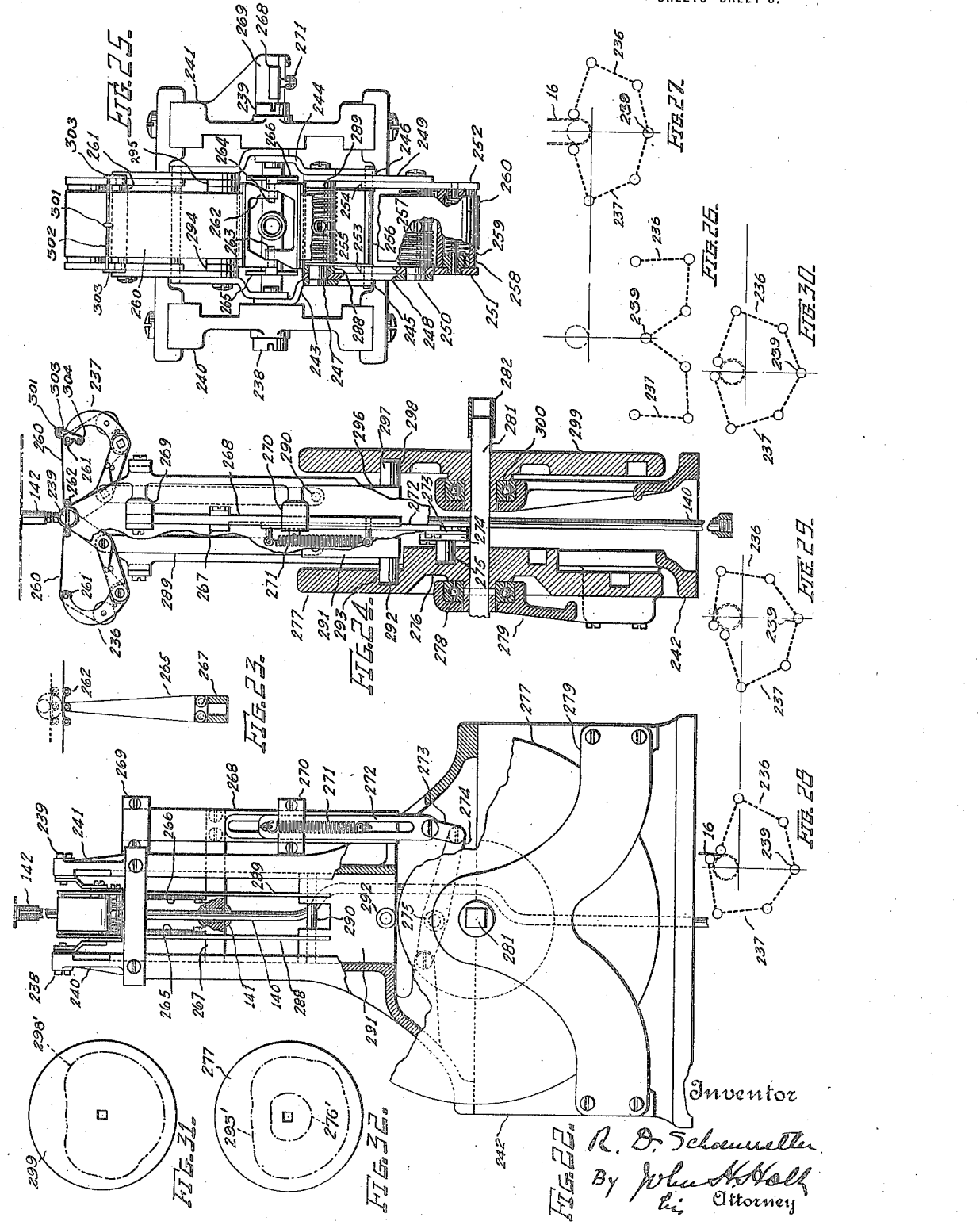

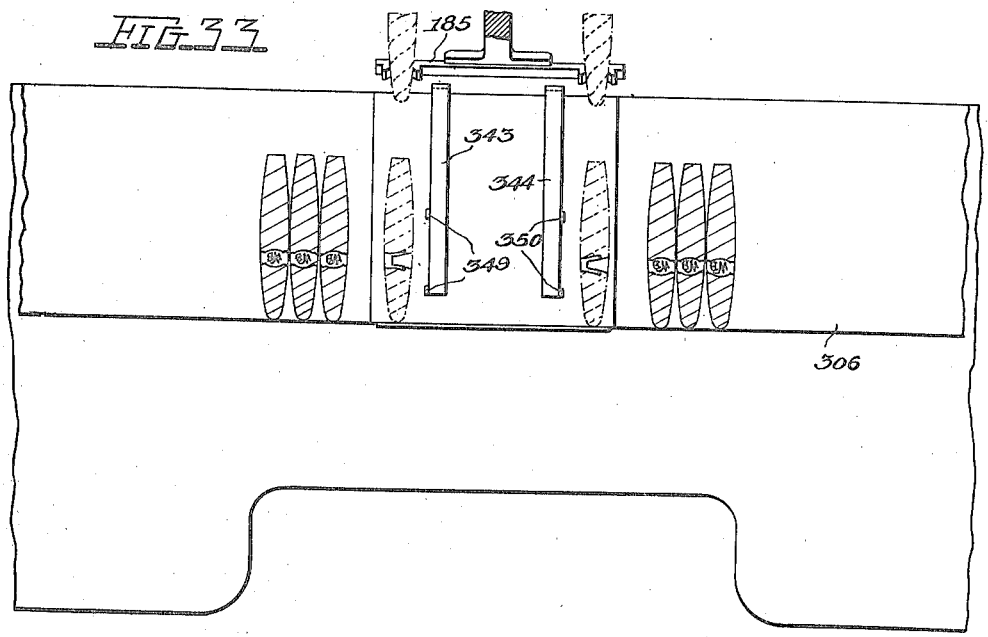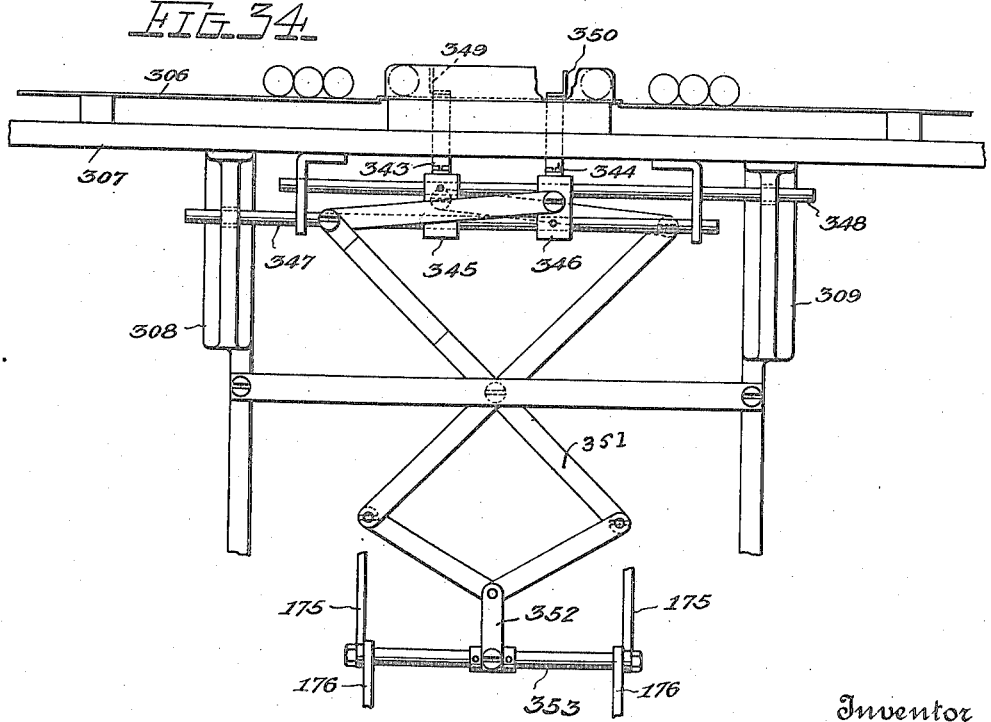

UNITED STATES PATENT OFFICE.

REINHOLD D. SCHOENWETTER, OF BALTIMORE, MARYLAND, ASSIGNOR, BY MESNE ASSIGNMENTS, TO THE NATIONAL MANUFACTURING COMPANY, OF BALTIMORE, MARYLAND, A CORPORATION OF MARYLAND.

CIGAR-BANDING MACHINE.

1,416,982.    Specification of Letters Patent.    Patented May 23, 1922.

Application filed August 16, 1916. Serial No. 115,200.

*To all whom it may concern:*

Be it known that I, REINHOLD D. SCHOENWETTER, a citizen of the United States, residing at Baltimore city and State of Maryland, have invented certain new and useful Improvements in Cigar-Banding Machines, of which the following is a specification.

The primary object of this invention is to provide a machine for supplanting the hand operator in applying bands to cigars after they have been packed and pressed in boxes, and it is a special characteristic of this machine that it imitates in many respects the human operator.

In applying bands to cigars there are several operations involved, the imperfect performance of any one of which precludes the proper application of the band. It is therefore essential in any machine designed to apply these bands that each of these operations be as perfectly performed as possible. In the first place, it is very important to guard against the application or attempted application of two bands to the same cigar, a thing liable to take place where the bands are fed from a magazine and two bands adhere to each other. Second, if the adhesive substance on the bands is too wet or too dry, imperfect sticking results. It is the usual practice in hand operation to use bands previously gummed at one end and to soften this gum by moistening. In the present machine this method is followed, but special pains has been taken to provide mechanism which will supply the proper amount of moisture, and which will allow the moisture thus applied to sufficiently soften the gum.

Another important point is to secure proper positioning of the band on the cigar both as regards distance from its ends as well as circumferentially. If the bands are not uniformly located on the cigar, they will not aline when the cigars are returned to the box and will therefore produce an unsatisfactory appearance. In the present machine special care has been taken with respect to this phase of the operation.

Also, it is essential that the actual wrapping of the band around the cigar be tight and straight, notwithstanding the fact that the cigars themselves have become pressed into irregular shapes and are not of a uniform size, a condition which is true even of cigars coming from the same box. In this operation, the present machine very closely imitates the fingers of a human operator in hand banding because this is the best method yet devised. In this machine, the intermediate or central portion of the band is pressed firmly against the face of the cigar or that part which was uppermost in the box and the ends wrapped therearound by a pair of fingers operating in a strikingly similar fashion to the human fingers, and which force the band around the cigar in such a way as to absolutely prevent bulging or looseness. These as well as other features of the machine will more fully appear from the more complete description to follow.

The cigars are fed to the machine face down and retain this position throughout the wrapping operation, and are discharged with their faces in the same position.

The present machine, however, is not limited to the banding of cigars after they have been boxed, though designed to do this because this is the method usually followed in hand banding.

It should also be understood that the machine here described is not necessarily limited to cigar banding, as there are many other articles which it may band with equal facility and without departing from the scope of my invention.

In order to more fully describe my invention, reference will be had to the accompanying drawings wherein:—

Fig. 1, is a vertical sectional elevation of one embodiment of my improved banding machine;

Fig. 2, a fragmentary top plan view thereof;

Fig. 3, a detail section of the suction controlling valve;

Fig. 4, a fragmentary sectional plan view taken on the line $4^x$—$4^x$, Fig. 1, with the cradle shifted to the band applying position;

Fig. 5, a fragmentary rear sectional elevation of the wetter mechanism and associated parts;

Figs. 6 and 9, details of the wetting mechanism;

Fig. 7, a detail view of the band magazine;

Fig. $7^a$, an enlarged fragmentary sectional detail of the band magazine;

Fig. 8, a detail view showing the band magazine in connection with the wetting mechanism and associated parts;

Fig. 10, a detail perspective view of one of stripper plates;

Figs. 11 and 12, detail views showing different operating positions of the cigar clamping mechanism with relation to the band applying mechanism;

Fig. 13, a detail view showing the band held in the stripper plates;

Fig. 14, a fragmentary detail side elevation partly in section of the depositor and cradle mechanism, showing these in the positions which they occupy at the commencement and end of a banding operation;

Fig. 15, a front elevation of the parts shown in Fig. 14;

Fig. 16, a fragmentary detail view, showing the slide control mechanism for freeing the cigar permitted to be discharged from the cradle;

Figs. 17 to 20, inclusive, details of the clutch drive;

Fig. 21, a top plan view of the depositor;

Figs. 22 to 25, inclusive, details of the banding unit;

Figs. 26 to 30, inclusive, diagrams illustrating the various steps in the operation of the fingers of the banding unit;

Figs. 31 and 32, diagrammatic views of the banding unit cams;

Fig. 33, a top plan view of the cigar receiving shelf and mechanism for pushing the cigars aside when discharged from the machine, and Fig. 34, a front elevation of the mechanism illustrated in Fig. 33.

The bands to be applied to the cigars are stacked one upon the other in a magazine comprising two uprights 1 and 2 (see Figs. 7 and 8) having offsets 3 and 4, at their bottoms, and slidably mounted for horizontal adjustment in grooved brackets 5 and 6 fast to a stationary frame 7. The uprights 1 and 2 are set in such position that their inner faces will be a distance apart approximately equal to the length of a cigar band, and are secured in this position by set screws 8 and 9. Secured to the lower ends of the uprights 1 and 2, respectively, are two plates 10 and 11 having each an inwardly extending portion or lip provided respectively with two steps or ledges 12, 13 and 14, 15 (Figs. 7 and 7ª). The cigar bands 16 are stacked between these uprights, and the lowermost band of the stack normally rests upon steps 12 and 14. The function of the steps 13 and 15 is to catch the inner band should two bands adhere by reason of the embossing thereon or otherwise and prevent it from following. A band so caught is shown by the curved broken line 16', Fig. 7.

Each of the bands is provided on one of its faces adjacent one end with a coating 17 (see Figs. 4 and 13) of gum arabic or other adhesive which when the bands are in the magazine is in a dry state. The bands are stacked in the magazine all with the gummed ends in the same direction and with the gummed face up. The gum applied to these bands gives one end thereof additional thickness, and when many are stacked, as above described, the side of the stack corresponding to the gummed ends of the bands would be much higher than the other side. To prevent this, upright 2 is provided with auxiliary steps or ledges 18 and 19. These support the ungummed ends of the bands in groups or sections, and as the supply of bands beneath either of these ledges becomes lessened the bands slide off the ledges and fall on the stack below.

The opposite ends of the bands in the magazine extend between two pairs of guides 20, 21 and 22, 23, secured for horizontal adjustment to the uprights 1 and 2, near their tops and bottoms by screw and slot connections 24, 25, as shown in Fig. 8. 26 and 27 indicate weights having toes 26' and 27' which rest upon the band stack at each end of the bands, said weights being vertically movable on guide rods 28, 29 and 30, 31, respectively, fast to uprights 1 and 2. Outwardly bent yoke pieces 29' and 30' Fig. 2, constituting continuations of the rods 28—29 and 30—31 respectively are for the purpose of supporting the weights when not in use on the labels. When putting a new supply of bands in the magazine, for example, the weights may be slid onto these yokes and then held out of the way until it is again desired to have them rest on the bands.

The bands are removed from the magazine by suction, and for this purpose there is provided, amongst other parts, a metal tube 32 having a gooseneck extending beneath the magazine and terminating in a flexible rubber nipple 33. This tube for a portion of its length is fast to a rocker arm 34 fast on rock shaft 35. This tube has inserted in its length a flexible splice 36 and extends to a port 37 in the seat of a slide valve 38. The seat of this valve is provided with another port 39 (see Fig. 3) which connects through a pipe 40 (Figs. 1 and 2) to a pump 41. The slidable member 42 of valve 38 is provided with a U-port 43 (Fig. 3) which may connect ports 37 and 39 according to the position of the member 42. Member 42 is held seated by block 44 under the tension of springs 45 and 46. The piston of pump 41 (Fig. 1) is driven by arm 47 fast on a rock shaft 48, said arm carrying a roller 49 which travels in a cam slot 50 of a cam 51 fast on an upright shaft 52. Shaft 52 receives rotation through a spiral gear 53 fast thereon and meshing with a spiral pinion 54 fast on a horizontal shaft 55 which is connected through spiral gears 56 and 57 to a vertical shaft 58 which receives rotation from an electric motor 59, through a clutch 60 of special construction hereinafter described.

Arm 34 carries a roller 61 which engages a cam slot 62 in the periphery of a cam 63 fast on shaft 58, whereby said arm has vertical reciprocating motion imparted to it for withdrawing the bands from the magazine as later described. When the machine starts into action from a state of rest or at the commencement of a cycle of operation, shaft 58, through cam 63 and roller 61, causes arm 34 to rise to a position where the flexible nipple 33 of the suction tube 32 is brought into engagement with the lowermost band in the magazine. At the same time that the suction nipple 33 is approaching the band to be extracted, arm 47 is passing downward and creating a suction in the nipple, which suction is sustained until a time later described. Directly after the nipple 33 engages the lowermost band in the magazine, arm 34 travels downward, causing the nipple 33 also to travel downward and withdraw the lowermost band from the magazine. This band, held upon the top of nipple 33 by suction created by pump 41, is then brought down upon the top of two fingers 64 and 65, fast to arm 66, in turn rigidly secured to a slide 67, mounted in a bracket 68 secured to frame 7, the gooseneck portion and nipple 33 of the suction tube passing down between said fingers. The fingers 64, 65, arm 66 and slide 67 constitute what may be designated the "band carrier". When the band comes in contact with these fingers, it is engaged by and temporarily retained on said arms by two clamps 69 and 70 pivotally mounted respectively on the two fingers 64 and 65. These clamps are under tension of individual springs 71 and 72 tending to rotate them downward or towards the fingers 64 and 65, but are normally held against rotation in this direction by lever 73 fast to a rock shaft 74, said lever having an offset 75 which engages with extensions 76 and 77 on the respective clamps. Rocking motion is imparted to shaft 74 for the purpose of operating lever 73, and for other purposes, by an arm 78 fast thereto and connected to an adjustable link 79 (Fig. 4) connected to a pivoted arm 80 carrying a roller 81 which engages with a cam slot 82 in a cam disc 83 fast on drive shaft 58. The rocking of shaft 74 also operates the sliding member 42 of valve 38, for which purpose said member is connected to said shaft through a link 84 and an arm 85 fast on the same collar 86 with arm 78, which collar in turn is fast to shaft 74. As soon as the band is brought down upon the tops of fingers 64 and 65, lever 73 rocks in an anti-clockwise direction (Fig. 1), whereupon clamps 69 and 70 are brought by the tension of their springs 71 and 72 down upon the band and clamp it upon the said fingers. Directly after this takes place, fingers 64 and 65 transport the band into the position for the wetting operation, and this is effected by the following mechanism: There is rigidly attached to the lower side of slide 67, a bracket 87 to which is connected a link 88, which in turn pivotally connects to the upper end of an arm 89 loosely mounted on rock shaft 74. Arm 89 is connected through a ball and socket joint 90 to a connecting rod 91 which is in turn connected through a ball and socket joint 92 to an arm 93 pivotally supported in a bracket 94 for angular movement around a vertical axis. This arm 93 carries a roller 95 which extends into a cam groove 96 in the lower face of disc 63. The rotation of disc 63 swings arm 93 so as to rock arm 89 clockwise, Fig. 1, thereby giving movement to slide 67 whereby the band is brought into the wetting position. In this position, the gummed end of the band lies directly beneath an endless fabric tape 97 forming a part of the wetting mechanism which comprises, amongst other parts, a reservoir 98, rigidly attached to one side of the machine outside thereof. This reservoir is provided with an extension 99 forming a mouth into which extends a trough 100 mounted for adjustment transversely of the machine. This adjustment is effected by a screw 101 engaging with a bracket 102 rigidly attached to the top of the trough and slidable in a slot 103 in fixed frame 7. (See Figs. 2 and 5). This trough carries a felt wick 104 which dips into water 105 carried in the reservoir, and passes thence downward through the inverted trough extension 101' where it engages the top of the upper layer of the endless tape 97. This tape is carried upon two pins or rolls 106 and 107 supported in outwardly flared spring plates 108 and 109 (see Fig. 9) rigidly attached at their upper ends to opposite sides of the trough. The spring plates 108 and 109 are under tension inwards so as to always tend to keep the upper and lower portions of the tape taut and separated.

When the gummed end of the band is brought beneath the wetting tape 97, as described, it comes momentarily to rest due to a pause in the travel of slide 67 effected by the shape of the cam groove in which roller 95 travels. During this pause, the gummed end of the band is pressed upward against the lower portion of tape 97, the lower portion of the tape against the upper portion thereof and the latter against the wick, by a presser 110, comprising an arm mounted fast on a shaft 111 mounted for rotation in an extension 112 of the wetter trough. This presser is yieldably connected to a bell crank lever 113 loosely mounted on shaft 111, said yieldable connection being formed by a spring 114 connected at one end to an extension 115 on lever 113, and at its other end to a stop lug 116 on the presser. Spring 114 at all times tends to pull the presser upwards to bring stop lug 116 into engagement with a stop lug 117 on the bell crank lever. The presser may therefore yield against the tension of the spring in a clockwise direction Fig. 5. As the presser recedes from the band after forcing it against the wetting tape, a stripper arm 118 fast on bell crank 113 strikes the top of the band and positively removes it from the wetting tape 97, thereby preventing it from adhering thereto.

For the purpose of imparting rocking motion to the lever 113, an arm thereof is pivotally connected to one end of a link 119, the other end of which is pivotally connected to a lever 120 fast on a sleeve 121 rotatable on a shaft 122 journaled in an upright bracket 123 mounted on the side frame of the machine. Another arm 124 fast to sleeve 121 is pivotally connected through a link 125 to one end of a lever 126 fulcrumed as at 127 on the top of a bracket 128 extending upward from frame 7. The other end of this lever 126 carries a roller 129 which travels in a cam groove 130 in cam 131 fast on shaft 52.

After pausing during the wetting operation, slide 67 takes up its travel again. At a certain point in this travel the band near each end is caused to pass over a pair of stationary strippers 132 and 133 which remove the band from the fingers 64 and 65 and retain it temporarily in position over the banding unit later described. These strippers consist each of a metal plate (see Fig. 10) having downwardly turned aft and fore portions 134 and 135, and a raised finger 136 to one side thereof, the said finger being curved slightly upwards at its free end. These strippers are rigidly supported respectively upon stud screws 137 and 138 adjustably secured to plate 137' mounted for angular adjustment in a horizontal plane on a stud 138' fast to stationary frame 7. This adjustment of plate 137' is effected by screws 138$^a$, 138$^b$. In its forward travel from the wetter, the band near its ends passes over and in engagement with the tops of the stripper fingers 136, thence past the free ends of these fingers. After the slide 67 has reached the end of its travel, it reverses its motion, whereupon the band near its ends passes between the fingers 136 of the strippers and the plates thereof. Continuing its travel in this direction, the band will be brought against shoulders 139 of the strippers and therefore prevented from following the travel of the carrier fingers 64, 65 farther in their back travel, whereupon it will be pulled from the clamps 69 and 70 and deposited on the stripper, as shown in Figs. 11 and 13, which now hold the cigar band in position above the wrapping unit, but not yet in position to be placed on the cigar. The band is brought into the latter position also by suction, and for this purpose there is provided, amongst other parts, a metal tube 140 which passes vertically through the wrapping unit and guided therein by bushings 141 (see Fig. 22) for vertical movement, said tube being provided at its upper end with a rubber or yieldable tip 142 for engaging the lower side of the cigar band. Tube 140 is reciprocated vertically by a lever 143 (see Fig. 1) fast on a rock shaft 144 on which is also fast an arm 145 which connects through a link 146 to a lever 147 fulcrumed at 148 and carrying a roller 149 which engages with a cam slot 150 in the periphery of a cam 151 fast on shaft 52. The lower end of tube 140 is fast to a block 152 which is yieldably connected through a spring 153 to lever 143. The lower end of tube 140 is in permanent connection with the pump cylinder 41 through a flexible tube 154 which connects to tube 140 through a passage 155 in block 152.

Cams 63 and 151 so time the movements of suction tubes 32 and 140, that they rise and withdraw the cigar bands from the magazine and from strippers 132, 133, simultaneously; that is to say, while a band is being withdrawn from the magazine, another band is being withdrawn from the strippers 132 and 133, to be placed in the wrapping position, the sequence of operations of the machine, later to be more particularly described, being such that while one band is undergoing the wetting operation, the preceding band is being applied to the cigar—a condition which I designate "prewetting." This not only allows time for the gum to become thoroughly softened, but it also allows time for drying in case too much moisture should be applied to the gum.

In Fig. 11 tube 140 is shown in broken lines in the position it occupies when in the raised position to withdraw a cigar band also shown in broken lines, from the stripper holders 132 and 133. This view also shows in full lines the cigar band 16 drawn down by the tube into position directly above the banding unit ready to be wrapped around the cigar. The band when held by strippers 132 and 133 in dotted line position of the band Fig. 11, is backed up by a seat 156 comprising the head of stud 138', and is forced against this seat by the nipple of tube 140 when it rises into engagement with the band.

The cigars to be banded are placed one at a time in a depositor, by which they are deposited in a cradle which carries them into position above the banding unit to have the band applied. This depositor, shown in detail in Figs. 2, 14, 15 and 21, comprises, amongst other parts, a U-shaped frame 157 fast to a block 158 slidably mounted to move vertically in a guide-way 160 formed in an extension or bracket 161 fast to the side of the machine. Pivotally mounted on the arms of frame 157 are two pairs of levers 162—163 and 164—165. Pivotally connected respectively to these pairs of levers are pairs of bent links 166—167 and 168—169, constituting jaws in which the cigars are deposited by the attendant. (See Fig. 2.) Levers 163 and 165 are connected to springs 170 and 171, exerting a pull in such direction as to cause the jaws to contract. When the depositor is in position to receive a cigar, however, these jaws are opened against the tension of said springs by rollers 172 and 173, respectively, (Figs. 15 and 21) carried on extensions of levers 163 and 165, and engaging respectively with stop plates 174 and 174' fast to stationary bracket 161. The depositor is carried downward to deposit the cigar in the cradle and then returns to its initial position; that is, reciprocates up and down, through the action of link 175 pivotally connected to slide block 158 at one end, and at the other to one end of a lever 176 fulcrumed on a shaft 177 (see Fig. 1) and carrying a roller 178 which travels in a cam groove 179 in a cam 180 fast on shaft 52. The position of the cigars in the depositor considered lengthwise of the cigar is gaged by an adjustable stop or shield 181 fast on a rod 182 held in different adjusted positions by a set screw 183.

The cradle mechanism which receives the cigars from the depositor and conveys them into the banding position comprises, amongst other parts, (see Figs. 1, 4, 14, 15 and 21) a frame 184 having three cross arms 185, 186 and 187 fast thereon. Arms 185 and 187 are provided with notched extensions 188 in which the cigar rests (see Figs. 14, 15 and 21). On arm 186 are fulcrumed two levers 189 and 190. The upper end of lever 189 (see Fig. 15) is pivotally connected to a bent link 191 which is also pivotally connected to the lower end of lever 190. The upper end of lever 190 is pivotally connected to a similar bent link 192 which is pivotally connected to the lower end of lever 189. In other words, levers 189 and 190 are cross connected by links 191 and 192 in such way that when these levers are turned on their pivots, parallel motion will be imparted to the links in opposite directions. Links 191 and 192 constitute jaws which engage the sides of the cigar and prevent it from falling from the carrier in transit. If motion be imparted to lever 189 (Fig. 15) in a clockwise direction, the jaws will mutually approach, and if motion be imparted to said lever in the opposite direction, the jaws will mutually recede. Lever 189 is, however, at all times under tension of a spring 193 tending to close the jaws.

Frame 184 is fast upon a rod or bolt 194 which extends into a vertical opening in the head of a rocker arm 195, the said frame being vertically adjustable with respect to said head by a milled nut 196 engaging a screw threaded portion 197 of rod 194 and adapted to be held rigidly in an adjusted position by a set screw 198. Frame 184 is held against angular movement about the axis of rod 194 by a guide pin 199 fast to the rocker arm head and passing through an opening in said frame.

Rocker arm 195 is fast to a collar 200 which is loosely mounted on a shaft 201.

Rocking motion is imparted to arm 195 through connecting rod 202 (Figs. 1 and 4), lever 203, connecting rod 204, an arm 205, a pivotally mounted sleeve 206 integral with said arm, and an extension 207 of arm 205 and carrying a roller 208 which engages a cam slot 209 in the lower face of cam disc 83. Connecting rod 204 is connected to arm 205 and lever 203 through universal joints 210 and 211.

In Fig. 1, the rocker arm 195 is at the extreme of its travel in one direction and in this position holds the cradle in position to receive a cigar from the depositor, and at this time the depositor is at the upper limit of its travel and in position to receive a cigar from the attendant, at which time jaws 166—167 of the depositor are at their maximum distance apart as are also jaws 168—169, due to the engagement of rollers 172 and 173 respectively with plates 174 and 174'. The attendant now places a cigar in the depositor face down as indicated in Fig. 1, at the same time operating a clutch, hereinafter described, which starts the machine into operation. Directly after this, the depositor descends and after it has traveled a part of the distance of its downward excursion, a cam 212 fast to the depositor frame engages a roller 213 on an arm 214 connected to lever 189 and acting therethrough causes the cradle jaws 191, 192 to open. The depositor continues to travel downward, whereupon the arms of its U-shaped frame 157 will pass downward between the arms of the cradle as indicated in top plan in Fig. 21, and below them. When this takes place, the cigar will be caught upon the notched extensions 188 of the cradle and the depositor will continue its downward movement, leaving the cigar in the cradle.

As the depositor travels down, cam 212 passes from engagement with roller 213 which permits the cradle jaws 191, 192 to close in on the cigar deposited therebetween.

As the depositor travels downward, the sides of a slot 215 in a guide 216 fast on slide 158, engage with a roller 217 on arm 186 of the carrier frame, thus insuring the proper relative positions of the depositor and cradle during the depositing operation.

The cigar now being firmly held in the cradle, rocker arm 195 travels in an anti-clockwise direction, Fig. 1, to a position where the cigar will be held as shown in Fig. 4, directly above the banding unit. The depositor then travels upward and returns to its initial position.

Directly after the cigar is brought into position to be banded, two clamps 218 and 219 (see Figs. 1, 11 and 12) descend upon it, and, together with the jaws 191 and 192 firmly hold the cigar in the cradle while being banded. These clamps consist each of a tubular plunger 220 having at one end flared portions 221 to which are secured a fabric band 222 so as to extend across the space between the flared portions as shown clearly in Figs. 11 and 12. These plungers are mounted to slide vertically in tubular extensions 223 and 224 on a frame 225 and are yieldable in said extensions against the force of the compression springs 226 (see Fig. 5). Frame 225 is lowered and raised to bring the clamps 218 and 219 into and out of engagement with the cigar, and receives this motion through links 227 pivotally connected thereto and to a bifurcated lever 228 (see Figs. 2, 11, 12 and 30) carrying a roller 229 which travels in a cam groove 230 in cam 131.

Frame 225 slides vertically on a guide rod 231 fast to frame 7. Frame 225 carries also a guide rod 232 which is adapted to travel vertically in a tubular extension 233 of frame 7. This latter rod performs two functions, it acts to positively prevent angular movement of the frame 225 around rod 231 as an axis, and it acts also in conjunction with a pair of rollers 234 and 235 on the cradle (see Figs. 4 and 14) as correcting means to insure the retention of the cradle in the correct banding position. When the cradle comes into position to place the cigar above the wrapping unit, rod 232 descends and passes between rollers 234 and 235 as shown in Fig. 12, thus bringing the cradle into the correct position if it has stopped a trifle short or gone a trifle over it, and retains it there until the cigar is banded. The actual operation of placing the band on the cigar is performed by a mechanism which acts very much as the human fingers would in performing this operation. This band applying mechanism, which I have hereinbefore referred to as the banding unit, is shown in detail in Figs. 22 to 32, and comprises, amongst other parts, two articulated fingers 236 and 237 pivotally mounted upon two shoulder screws 238 and 239 carried respectively in the upper ends of two castings 240 and 241 mounted on a pedestal 242, which is in turn supported upon a stationary post 242ª (Fig. 1) of the machine frame. These fingers comprise each two outer link members 243 and 244 rotatably mounted upon pivot screws 238 and 239, and having extensions or toes 245 and 246 respectively. Mounted in these outer members is a spindle 247 prevented from rotation therein by a square end.

Mounted to rotate on this spindle are two link members 248 and 249 which carry near their outer ends a spindle 250 held against rotation therein by a squared end. The spindle 250 in turn forms a pivot for a pair of link members 251 and 252, provided with extensions or toes 253 and 254 respectively. A coil spring 255 on spindle 247 tends to force a stop pin 256 carried by members 248 and 249 against toes 245 and 246, and a coil spring 257 on spindle 250 tends to force toes 253 and 254 of members 251 and 252 against the same stop pin 256, so that in the normal positions of the fingers, as shown in Fig. 24, they are crooked, and any straightening out of the finger joints or articulations takes place against the resistances of said coil springs.

Each of said fingers carries between its outer members 251 and 252 a hollow roller 258, each under tension of a spring 259 tending to rotate said rollers in opposite directions. Fast to each of these rollers is a tape 260 which passes over small roller 261 at the outer extremity of the finger and thence to a clip or holder 262. These tape holders 262 are pivotally mounted upon pins 263 and 264 carried respectively by the upper ends of two thin metal arms 265 and 266 fast at their lower ends in a vertically slidable block 267. This block is fast to a slide 268 adapted to reciprocate vertically in brackets 269 and 270. Slide 268 is yieldably connected through a spring 271 with a vertically reciprocating slide 272 connected through a link 273 to a lever 274 which carries a roller 275 engaging a slot 276 in a cam 277 mounted on ball bearings 278 in a frame 279 fast to casting 280, which forms a support for castings 240 and 241. Cam 277 has a square central opening through which extends a square shaft section 281 which is connected through a coupling 282 to a driving shaft 283 which receives power from shaft 55 through spiral gears 284, 285 and intermittent gears 286 and 287.

Directly after a cigar is brought into position to be banded, slide 272 rises under the action of disc 277 and lever 274, and acts through spring 271 to carry slide 268 upward, and this in turn acts through block 267 and vertical arms 265 and 266 to carry the tape holders 262 and the ends of the tapes 260 up against the bottom of the cigar, the spring 271 allowing the arms 265 and 266 to yield downwards to accommodate the action to cigars of different diameters. Directly after this takes place, the fingers 236 and 237 come into action to do the actual wrapping.

Finger 236 receives its motion for this purpose through a pair of links 288 and 289 pivotally connected at their upper ends to the spindle 247 and pivoted at their lower ends on a rod 290 in a block 291 vertically slidable in castings 240 and 241 and carrying a roller 292 which engages a cam slot 293 in cam 277.

Finger 237 receives its motion through a similar mechanism comprising a pair of links 294 and 295 identical with links 288 and 289, pivotally connected at their upper ends to spindle 247 of finger 237, and at their lower ends pivoted to a block 296 vertically slidable in castings 240 and 241, and carrying a roller 297 engaging a cam slot 298 in a cam 299 mounted on roller bearings 300 and driven square shaft 281.

Assuming that a cigar is held in position to be banded as shown in Figs. 4 and 12, the following are the operations of applying the band. First, uprights 265 and 266 rise and push the central part of the band against the lower face of the cigar, at the same time elevating the inner ends of tapes 260. Directly after this takes place the fingers 236 and 237 come into operation. First these fingers rise simultaneously, the rollers 261 passing inwards towards the cigar and causing the tapes 260 to partially wrap the band about the cigar as shown in Fig. 12. The fingers continue this movement until the rollers 261 assume the positions shown in Fig. 27. Here finger 236 pauses, but finger 237 continues its motion, forcing its roller 261 across the top of the cigar to the position shown in Fig. 28. During this last step finger 237 acts through its tape 260 to completely wrap one end of the band down on the cigar. Then finger 237 descends and finger 236 is forced higher. In this step of the operation, the rollers 261 of the two fingers travel in an anti-clockwise direction from the position shown in Fig. 29, whereupon the upwardly extending end of the band is wrapped down upon the other end. In the next step, finger 236 is pulled down and finger 237 simultaneously pushed up, causing the rollers 261 of the two fingers to travel simultaneously in a clockwise direction until they assume the positions shown in Fig. 30. Directly after this, both fingers are drawn down simultaneously to the initial positions shown in Fig. 26. The rollers 261, it will be observed, do not act directly on the band, but do so through tapes 260. Figs. 26 to 30, inclusive, are purely diagrammatic, and the tapes 260 have been omitted for the sake of clearness. These tapes so hold the band that the back travel of the rollers 261 cannot cause any bulging of the band.

The tips of the fingers are forced inwards towards the cigar under the action of springs 255, while the pressure downward on the cigar is effected through the springs 257.

For the purpose of preventing the gummed portion of the band from coming in contact with the tape 260 carried by finger 236, there is mounted on the outer end of finger 237, a small disc 301 carried on a rod 302 held in two pivoted side plates 303 connected by a rod 304, (see Figs. 24 and 25). The disc 301 rests upon the top of the tape 260 of finger 237. Therefore, when the fingers move from the position shown in Fig. 28 to the position shown in Fig. 29, the gummed end of the band cannot be forced by arm 236 down upon the tape 260 of arm 237 on account of the obstruction thereto caused by disc 301. It is extremely important to keep the faces of the tapes 260 which come into engagement with the bands from adhesion, otherwise they would stick to the band and pull it away from the cigar when the tapes recede.

The above described motions are imparted to the fingers by the irregular cam grooves 293 and 298, the central lines of which are indicated by broken lines 293' and 298' in Figs. 31 and 32. The center line of cam groove 276 is indicated by broken line 276', Fig. 32.

The band now on the cigar, clamps 218 and 219 rise and the cradle rocker arm 195 rocks back to its initial position, carrying the banded cigar with it. Just after this rocker arm starts on its back travel, jaws 191 and 192 of the cradle mutually recede open, thus freeing the cigar which slides point end foremost out of the cradle onto a shelf 306 supported on second shelf 307 supported on brackets 308 and 309 secured to the front of the machine. For the purpose of thus opening jaws 191 and 192, the following mechanism is provided. (See Figs. 1, 14 and 15). Link 214 connected to jaw lever 189 is connected to a dog 310 pivoted on a bracket 311 on the head of rocker arm 195. This dog is operated upon as hereinafter described by a roller 312 on a bar 313 slidably mounted on rocker arm 195 and rigidly connected by a bar 314 to a bar 315 slidably mounted on rocker arm 195. The latter bar carries a roller 316 which engages with the upper edge of a rocking cam 317 fast to shaft 177.

When the depositor and cradle occupy the relative positions shown in Fig. 1, roller 316 rests upon the peak 318 of cam 317. As the depositor descends, however, arm 176 rocks shaft 177 in a clockwise direction (Fig. 1) causing cam 317 to rock in the same direction until roller 316 rests in cam depression 319.

This permits roller 213 (Fig. 15) to pass into the path of cam 212, so as to be operated thereby. While rocker arm 195 is traveling forward to the band applying position, cam 317 remains stationary, and during this time roller 316 travels on that part of the portion 320 of cam 317 which is concentric for a small portion of its curved surface with the centre of shaft 201 when the cam 317 is in the position just described and said concentric portion is also tangent to the bottom of depression 319, thereby not operating the cigar holding jaws 191, 192 of the cradle.

While the depositor is rising and resetting, arm 176 rocks cam 317 anti-clockwise (Fig. 1) until its depression 319 engages roller 316, where it remains during the banding operation. Directly after rocker arm 195 starts on its back travel to the position shown in Fig. 1, roller 316 rides up on the peak 318 of cam 317, thus forcing rod 316 up and opening jaws 191 and 192, thereby freeing the cigar and allowing it to pass from the cradle as described.

At the end of each complete cycle of operations in banding a cigar, the machine comes automatically to rest and may be started again only by the manual operation of a trip mechanism actuated by the hand of the operator in placing a cigar in the depositor to be banded. For this purpose the following mechanism is provided (see Figs. 17, 18, 19 and 20). This mechanism comprises amongst other parts, a two part casing 321 into which shaft 58 extends, and in which it is journaled at its lower end. Rotatably mounted on shaft 58 in casing 321 is a worm 323 which meshes with a worm 324 also in casing 321 and fast on the armature shaft 325 of the continuously operating electric motor 59. Worm wheel 323 is fast by a key 326 to a ratchet 327 loose on shaft 58. Located just above ratchet 327 and fast on shaft 58 is an arm 328 on which is pivoted a pawl 329. This pawl is under tension of a spring 330 tending always to pull its nose into engagement with the teeth of ratchet 327. On one end of this pawl is mounted a roller 331 which is adapted, as hereinafter described, to impinge on a cam 332 formed on trip lever 333 connected through a rod 334 and bell crank lever 335 to a push rod 336 having a hand rest 337 located adjacent the depositor.

A spring 338 exerts a pull on bell crank lever 335 in such a direction as to retain push rod 336 in either its up or down position.

When the operator places a cigar in the depositor, her hand will naturally lie upon hand rest 337. The weight of the operator's hand sends push rod 336 down, which actuating the bell crank 335 and rod 334 rotates trip 333 in such direction as to release its cam head 332 from roller 331, whereupon pawl 329 under the action of spring 330 will engage the teeth of ratchet 329 and couple the shaft 58 positively to the motor. Directly after this takes place, however, a bevel 339 on an extension 340 of arm 328 will engage the trip lever 333 and reset it so that when roller 331 comes around to the point where it has completed one revolution, it will engage came 332 and disengage pawl 329 from ratchet 327, whereupon shaft 58 comes again to rest, the latter taking place at the end of a complete cycle of operation to band a cigar. The machine therefore comes to rest at the end of each cycle of operations of banding a cigar, and may be started only by the recoupling of the driving clutch. The machine therefore operates only when performing a banding operation.

The general frame of the machine comprises two side plates 341, one of which is shown in Fig. 1, and between which the parts there shown are mounted. These may be supported upon suitable legs 342. The provision of a suitable frame structure, however, is merely a matter of design, and for this reason will not be dealt with in the present description except in a very general way.

The actual machine from which the accompanying drawings were made was designed to operate with two units placed alongside each other and having certain mechanism in common. For example, the tube carrying arm 34 serves both units and the tube 32 is branched for this purpose; the arm 66 carries at its opposite ends duplicate arms 64, 65; the cradle arms 185, 186 and 187 carry duplicate cigar holding means at their opposite ends, the trough 100 extends far enough to supply two units, and so on, but as the employment of an additional unit involves merely a duplication of parts, the foregoing description of the machine has been limited to one unit alone.

For the purpose of pushing the cigars aside out of the way as they are deposited on the shelf 306 from the cradle, the following mechanism is provided: This mechanism, as shown, is provided for two banding units, and comprises, amongst other parts, two U-shaped members 343 and 344, an arm of each of which extends over and above the shelf, while the other arms are fast respectively to block 345 and 346, slidably mounted on guide rods 347 and 348. The upper arms of the members 343 and 344 are provided respectively with upwardly extending prongs 349 and 350 adapted to engage the cigar as hereinafter described. Members 343 and 344 are operated to reciprocate simultaneously in opposite directions by lazy tongs 351 connected at their upper ends to blocks 345 and 346, and at their lower ends through a link 352 and rod 353 to the lower ends of links 175. When links 175 rise to return the cigar depositors to normal, the lazy tongs acting through blocks 345 and 346 force the members 343 and 344 away from each other, causing prongs 349 and 350 to push the cigars last deposited on the table to one side. In doing this, the cigars are rolled over so that the top of the band will appear uppermost, thus arranging the cigars in the proper order to be returned to the box.

Various modifications may be made in the specific form of my invention here shown and described without departing from the spirit of the invention or the scope of what I claim.

What I claim is:—

1. In a banding machine, the combination with a band containing magazine, of a carrier, means to withdraw said bands individually from said magazine and deposit them individually on said carrier, clamping means adapted to hold an individual band so deposited in place on the carrier, a wetter, a band holder, and mechanism to impart motion to said carrier to bring the band thereon into operative relation first with the wetter and then into position to be deposited in said holder.

2. In a banding machine, the combination with a band containing magazine, of a carrier, means to withdraw said bands individually from said magazine and deposit them individually on said carrier, spring operated clamping means adapted to hold the bands so deposited in place on the carrier, a wetter and a band holder, and mechanism to impart reciprocating motion to said carrier, first to bring the band into operative relation with the wetter and then into position to be deposited in the holder, said holder comprising means to strip the band from the carrier, band applying mechanism, and means to deliver the bands individually from said holder to said band applying mechanism.

3. In a banding machine, the combination with a band containing magazine, of a carrier, suction means to withdraw said bands individually from said magazine and deposit them individually on said carrier, spring operated clamping means adapted to hold the bands so deposited in place on the carrier, a wetter, a band holder, and mechanism to impart reciprocating motion to said carrier in one direction in two steps, first to bring the band into operative relation with the wetter and then into operative relation with the holder, and back to its initial position by a continuous motion, said holder comprising means to strip the band from the carrier on the back travel thereof.

4. In a banding machine, the combination with a band carrier, of means to impart reciprocating motion thereto, forward in two steps, a wetter into operative relation to which a band in said carrier is brought by the first of said steps, and a band holder adapted to receive a band from said carrier subsequent to its first step, said band holder including means to obstruct the motion of the band on the back travel of said carrier to strip it from said carrier.

5. In a banding machine, the combination with a band carrier, of means to impart reciprocating motion thereto, yieldable clamping means to hold a band on said carrier, and stationary stripping means to remove said band from said carrier while the latter is in motion.

6. In a banding machine, a reciprocating band carrier, and means to remove the bands therefrom comprising a pair of stationary strippers having portions adapted to engage the bands near the opposite ends, and adapted to obstruct the movement of said bands with relation to said carrier and to thereby remove the band from the carrier.

7. In a banding machine, the combination with a band carrier, of means to impart reciprocating motion thereto, forward in two steps, a wetter into operative relation to which a band in said carrier is brought by the first of said steps, a band holder adapted to receive a band from said carrier subsequent to its first step, said band holder comprising means to strip the band from the carrier, band applying mechanism, and means to withdraw a band from said holder and deliver it to the band applying mechanism.

8. In a banding machine, the combination with a band carrier, of means to impart reciprocating motion thereto, forward in two steps, a wetter into operative relation to which a band in said carrier is brought by the first of said steps, a band holder adapted to receive a band from said carrier subsequent to its first step, band applying mechanism, and suction means to remove the band from said holder and deliver it to said band applying mechanism.

9. In a banding machine, the combination with a band carrier, of means to impart reciprocating motion thereto, a wetter into operative relation to which a band is brought by said carrier, and a band holder adapted to receive a band from said carrier subsequent to the wetting operation, said band holder comprising means to strip the band from the carrier on its back travel.

10. A banding machine, comprising band applying mechanism, mechanism to support the article while being banded, and clamping means comprising a pair of yieldable plungers each having a flexible strip held between two arms, and means to reciprocate said plungers to bring said flexible strips down on the article to be banded and remove them therefrom.

11. A banding machine, comprising a wick, a fabric tape or band extending across the face of said wick in two thicknesses or layers, yieldable means tending to separate the layers of said fabric, means to bring a band, having a gummed portion to be moistened, into position to be forced against the outer face of the outer layer of said fabric, means to force said gummed portion against said outer layer, the outer layer against the inner layer, and the inner layer against the wick in one operation, positively acting means to strip said band from said outer layer of fabric, band applying mechanism, and means to deliver said band thereto with the gum thereon in a moistened condition.

12. A banding machine, comprising means adapted to contain moisture, a pusher for moving a gummed portion of a band into engagement therewith, and a stripper positively acting to remove said gummed portion from said moisture containing means, and mechanism to apply said bands to the article to be banded.

13. A banding machine, comprising means adapted to contain moisture, a pusher comprising a pivoted arm having a head portion adapted to engage a band and push a gummed portion thereof against the moisture containing means, and a stripper arm acting when the pusher recedes from the band to engage the latter and positively remove it from the moisture containing means, and mechanism to apply said bands to the article to be banded.

14. A banding machine, comprising a wick, a piece of fabric extending across the face of said wick, and means to push a gummed portion of a band into engagement with said fabric and move the fabric in the direction of said wick, stripping means to positively remove said gummed portion of the band from engagement with said fabric, and mechanism to apply said bands to the article to be banded.

15. A banding machine, comprising a wick, a fabric tape or band extending across the face of said wick in two thicknesses or layers, yieldable means tending to separate the layers of said fabric, means to bring a band, having a gummed portion to be moistened, into position to be forced against the outer face of the outer layer of said fabric, means to force said gummed portion against said outer layer, the outer layer against the inner layer, and the inner layer against the wick, band applying mechanism and means to deliver the band thereto with the gum thereon in a moistened condition.

16. A banding machine, comprising a trough having a downwardly dipping section inverted with relation to the main body of the trough, a wick in said main body and extending into said downwardly dipping section, a tape extending across said wick in said downwardly dipping section, resilient supports for said tape secured to the sides of said trough and tending to separate the layers of said tape by holding them taut. and means to force a gummed portion of a band to be moistened against the outermost layer of said tape, and the innermost of said layers against the wick.

17. In a banding machine, a cradle having holding means comprising movable jaws, mechanism to deposit an article to be banded between said jaws, mechanism to open said jaws to receive the article and to close them on the article, means for adjusting the elevation of said cradle and thereby adjusting the throw of said jaws, band applying mechanism, mechanism to move said cradle into operative relation with said depositing mechanism and band applying mechanism alternately.

18. In a banding machine, a cradle having holding means comprising movable jaws, mechanism to deposit the article to be banded between said jaws, mechanism to automatically open said jaws to receive the article and then cause them to close thereon, band applying mechanism, mechanism to move said cradle into operative relation with said depositing mechanism and band applying mechanism alternately, and means to open said jaws of said cradle after a band has been applied to a cigar and before the cradle comes into position to receive a cigar from the depositor.

19. In a banding machine, a cradle having holding means comprising movable jaws, mechanism to deposit the article to be banded between said jaws, band applying mechanism, mechanism to move said cradle into operative relation with said depositing mechanism and band applying mechanism alternately, and means to open said jaws of said cradle after a band has been applied to a cigar and before the cradle comes into position to receive a cigar from the depositor.

20. A banding machine, comprising a movable depositor having holding means for the article to be banded, a rocker arm and a cradle carried thereby provided with holding means for the article to be banded, band applying mechanism, means to rock said arm into the path of the movement of said depositor to receive said article therefrom and then into operative relation with said band applying mechanism.

21. A banding machine, comprising a cradle adapted to support the article to be banded, jaws carried by said cradle and adapted to engage said article, a depositor for placing said article between said jaws, means to effect relative movement between said depositor and cradle to transfer said article from one to the other, and mechanism operated by said movement to operate said jaws of the cradle.

22. A banding machine, comprising an oscillatory cradle having means to hold the article to be banded, a movable depositor having means to hold the article to be banded, and means to effect relative motion between said cradle and depositor to transfer the article from said depositor to the cradle.

23. In a banding machine, depositing mechanism comprising a frame, a pair of rocking levers pivoted on said frame, and a pair of bent links forming jaws, one end of one link being pivoted to one end of one of said levers, the corresponding end of the other link being pivoted to the other end of said lever and the other ends of said links being pivoted to the ends of the other lever.

24. In a banding machine, depositing mechanism comprising a frame having links comprising jaws pivotally mounted on said frame and adapted to engage an article to be wrapped, and means to move said links simultaneously to open and close said jaws.

25. In a banding machine, a bifurcated frame, links comprising jaws pivotally mounted on said frame and adapted to engage and retain the article to be banded, and yielding mechanism for imparting simultaneous motion to said links.

26. In a banding machine, depositing mechanism comprising a bifurcated frame, jaws mounted thereon adapted to engage and retain the article to be banded, and means to impart motion to said jaws, a cradle having means to receive the article from the depositor, and mechanism to move said depositor past said cradle and astride thereof to transfer the article from the depositor to its cradle.

27. A banding machine, comprising a reciprocatory depositor having arms provided with means for holding the article to be banded, an oscillatory cradle having arms provided with means for holding said article, and mechanism to effect relative motion between said depositor and cradle, said depositor and cradle being so located that the arms of the depositor pass between arms of the cradle and thereby transfer said article from the depositor to the cradle.

28. A banding machine, comprising band wetting means, band holding means, mechanism to transfer a band from said wetting means to said holding means, band applying means, and suction means to remove said band from said holding means and place it in operative relation to said band applying means.

29. In a banding machine, band applying mechanism comprising a pair of articulated fingers having tensioning means individually applied to their respective joints, and means to impart motion to said fingers transversely of the longitudinal axis of the article to be banded to wrap the band thereon.

30. A banding machine, having band applying mechanism comprising two articulated fingers fulcrumed upon a fixed pivot at their inner ends, means to impart angular movement to said fingers individually on said pivot, and tensioning means individual to each finger tending to cause the separate joints or sections of one finger to move on their individual pivots towards the other finger.

31. A banding machine, having band applying mechanism comprising two articulated fingers fulcrumed upon a fixed pivot at their inner ends, means to impart angular movement to said fingers individually on said pivot, and tensioning means individual to each finger tending to cause the separate joints or sections of one finger to move on their individual pivots towards the other finger, and tapes operated by said fingers to wrap the band around the article to be banded.

32. In a banding machine, band applying mechanism, comprising a pair of tapes, means to position a band above said tapes and extending longitudinally thereof, means to which one end of each tape is attached, said means being movable transversely of the band, but immovable longitudinally thereof, a pair of spring tensioned rollers to which the other ends of the tapes are respectively attached, yielding means to elevate the ends of the tape held against said longitudinal movement and thereby force the band into engagement with the article to be banded, a finger individual to each of said tapes and operatively associated therewith to wrap each of said tapes against the tension of their respective rollers partially around said article exterior to the band.

33. In a banding machine, band applying mechanism comprising an articulated finger, a tape secured at one end of said finger, and means to impart motion to said finger to wrap said tape partially around the article to be banded exterior to the band.

34. In a banding machine, band applying mechanism comprising a pair of articulated fingers, and means to move them transversely of the article to be banded, simultaneously inwardly towards the article, then one of said fingers towards the other, then both fingers simultaneously in the opposite direction to the last mentioned movement, then both fingers simultaneously in a reverse direction to that in which the two were last simultaneously moved, to apply the wrapper.

35. In a banding machine, band applying mechanism comprising a pair of fingers, and tapes connected to and operated by said fingers for applying the band to the article to be banded, said tape being connected at their inner ends to a point intermediate of said fingers.

36. In a banding machine, band applying mechanism, comprising a support, a pair of articulated fingers mounted upon a fixed pivot carried by said support, a member pivotally connected to each of said fingers for moving them bodily and separately about said pivot, power driven cams operating said members and timing the movement of said fingers, springs applied to individual joints of said fingers, tape holding means located at a point above said fixed pivot, a spring tensioned roller carried by each of said fingers, a tape attached to each of said rollers and to said tape holding means, means carried at the outer end of each of said fingers over which said tapes pass, means to hold the band to be applied directly over the tape and longitudinally thereof, and means to elevate the inner ends of the tapes to bring the band against the article to be banded.

37. A band applying machine, comprising band wetting means, band holding means, mechanism to transfer a band from said wetting means to said holding means, band applying means, a movable tube, means to create a suction in said tube to cause a band to adhere thereto, and means to impart movement to said tube to withdraw said band from said holding means and place it in operative relation to said band applying means.

38. In a banding machine, means to moisten a gummed portion of a band to be applied and acting previously to the collocation of the band and the article, mechanism to apply a band thus moistened to the article to be banded, the band applying mechanism operating upon one band while the moistening mechanism is operating on a succeeding band to be applied.

39. In a banding machine, means to moisten a gummed portion of a band to be applied, mechanism to apply the band thus moistened to the article to be banded, a band containing magazine, a carrier adapted to convey the band from the magazine to the moistening device and thence into position over said band applying mechanism, and means to effect a pause in said travel during the moistening operation, and means to operate the band applying mechanism during said pause to apply a previously moistened band.

40. In a banding machine, band-applying mechanism comprising an articulated finger, a tape fixed at one end and having the other end thereof secured to said finger and means to impart motion to said finger to wrap said tape partially around the article to be banded exterior to the band.

41. A banding machine having means to receive the articles to be banded, and deposited therein individually, band applying mechanism, a cradle and means to rock the same back and forth to convey articles from the receiver to the band applying mechanism, automatic means to stop the operation of the machine each time the cradle returns to the receiving mechanism, and manual means to start said machine into operation.

42. In a banding machine, band applying mechanism comprising a pair of fingers, a fixed support on which said fingers are pivotally mounted and means to move the ends of said fingers transversely of the longitudinal axis around the article to be banded both in the same and opposite directions, and a tape having its end secured to and operated by said fingers to wrap the band on the article.

43. In a banding machine, band applying mechanism comprising a tape, mechanism to operate said tape to apply to the article to be banded, a band having a gummed portion, and means to prevent contact between said gum and tape.

44. In a banding machine, band applying mechanism comprising a pair of fingers, tapes operated by said fingers for applying to the article to be banded a band having a gummed portion, and means carried by one of said fingers to prevent the other finger from thrusting the gummed portion of the band into engagement with the tape.

45. A banding machine comprising band applying mechanism, a cradle for conveying the article to be banded into operative relation with said mechanism and holding the article while being banded, clamping mechanism adapted to descend upon the article in the cradle and holding the same during the banding operation, and locking means operating simultaneously with the said clamping means and acting to hold said cradle in a fixed position during the banding operation.

46. A banding machine comprising band applying mechanism, a cradle for conveying the article to be banded into operative relation with said mechanism, mechanism for depositing said article in said cradle, means for effecting relative motion between said depositing mechanism and cradle for effecting the transfer of said article to said cradle, and means to interlock said depositing mechanism with said cradle during said transferring operation to retain the two in fixed alinement.

47. In a banding machine, the combination with a band carrier, of a band containing magazine, means for taking a band from said magazine and placing it on said carrier, clamping means to hold the band on said carrier, stripping means to remove said band from said carrier, and means to impart motion to said carrier to bring it into operative relation with said first-named means and said stripping means.

In testimony whereof I affix my signature in the presence of two witnesses.

REINHOLD D. SCHOENWETTER.

Witnesses:
  COLUMBUS O'DONNELL LEE, Jr.,
  FRED M. COTH.